(12) United States Patent
Ressler et al.

(10) Patent No.: US 9,361,882 B2
(45) Date of Patent: Jun. 7, 2016

(54) SUPERVISOR TRAINING TERMINAL AND MONITOR FOR VOICE-DRIVEN APPLICATIONS

(75) Inventors: Michael J. Ressler, Pittsburgh, PA (US); Eric W. Stark, Bethel Park, PA (US); Peter A. Wilton, Oakmont, PA (US)

(73) Assignee: Vocollect, Inc., Pittsburgh, PA (US)

( * ) Notice: Subject to any disclaimer, the term of this patent is extended or adjusted under 35 U.S.C. 154(b) by 1716 days.

(21) Appl. No.: 12/115,858

(22) Filed: May 6, 2008

(65) Prior Publication Data

US 2009/0281785 A1    Nov. 12, 2009

(51) Int. Cl.
  *G06F 17/28* (2006.01)
  *H04R 1/10* (2006.01)
  *G08B 5/36* (2006.01)
  *G10L 15/22* (2006.01)
  *G10L 13/04* (2013.01)

(52) U.S. Cl.
  CPC .............. *G10L 15/22* (2013.01); *G10L 13/04* (2013.01); *G06F 17/289* (2013.01)

(58) Field of Classification Search
  CPC .............................. G06F 17/289; H04R 5/033
  USPC ......................................... 704/2, 251; 381/74
  See application file for complete search history.

(56) References Cited

U.S. PATENT DOCUMENTS

| | | | |
|---|---|---|---|
| 5,530,643 A | 6/1996 | Hodorowski | |
| 7,885,419 B2 * | 2/2011 | Wahl et al. | 381/74 |
| 8,339,248 B2 * | 12/2012 | Carroll | 340/286.09 |
| 2004/0059579 A1 | 3/2004 | Murawski et al. | |
| 2006/0293893 A1 * | 12/2006 | Horvitz | 704/251 |
| 2007/0080930 A1 | 4/2007 | Logan et al. | |
| 2008/0004858 A1 * | 1/2008 | Gao et al. | 704/2 |

OTHER PUBLICATIONS

Four-page International Search Report mailed Sep. 11, 2009 for PCT/US2009/042686.
Eight-page Written Opinion from International Search Report mailed Sep. 11, 2009 for PCT/US2009/042686.
Two-page article from Retail Technology entitled, "Vocollect is the perfect pick at Nisa-Today's"; Copyright 2004 BPL Business Media, Ltd.

* cited by examiner

*Primary Examiner* — Farzad Kazeminezhad
(74) *Attorney, Agent, or Firm* — Additon, Higgins & Pendleton, P.A.

(57) ABSTRACT

A system for supervising an operator in a speech-driven environment includes an operator terminal configured for running a bi-directional speech task with an operator in a first spoken language wherein the speech task includes a plurality of successive nodes that are encountered by the operator, indicating progress through the task. A supervisor terminal is configured for running a bi-directional speech task with a supervisor in a second spoken language that is different from the first spoken language. A communication link exists between the operator terminal and supervisor terminal for communicating information therebetween. The operator terminal communicates, to the supervisor terminal, information regarding progress through the operator terminal speech task. The supervisor terminal progresses through the supervisor terminal speech task synchronized with the progress of the operator terminal speech task. A monitor is configured for displaying the operator's node-by-node progression upon receipt of speech data from said operator terminal.

22 Claims, 3 Drawing Sheets

SUPERVISOR TRAINING TERMINAL AND MONITOR FOR VOICE-DRIVEN APPLICATIONS

BACKGROUND OF THE INVENTION

In a voice-driven work environment, speech or voice is often utilized as a tool for directing a worker to perform a series of tasks. Such a voice-driven system often utilizes a central computer system that controls a multitude of work applications and their progress, and communicates with a plurality of mobile or portable terminals. The mobile terminals are worn or carried by workers, and are used by the workers or other users to receive voice direction from the central computer system, and to provide data and other input to the central computer system. The portable terminals take advantage of text-to-speech (TTS) capabilities to direct a worker, with speech, to perform a specific task, and utilize speech recognition to convert the answers and speech of the user to a digital form that may be utilized by the central computer system.

As may be appreciated, such voice-driven systems provided significant efficiency in the work environment. The bi-directional speech communication stream of information is exchanged over a wireless network between the mobile terminals and the central system to allow operator mobility. Typically, the worker (or operator) wears a mobile terminal, which includes a headset with a microphone and an ear speaker. Through the headset, the operator is able to receive voice instructions about a task, ask questions, report the progress of the task, and report various working conditions, for example.

One predominant use for such voice-driven systems is for tasks associated with inventory/order-based industries, such as product distribution. The central computer system runs a program for product tracking and management, and for order filling. The operators perform manual product picking and placement tasks, per instructions through the bi-directional speech applications of the mobile terminals. The terminals allow the operators to interface with the central system, so that they may take directions of where to go to get certain items in an order, respond to the directions, respond to inquiries, enter data, and confirm the completion of a task.

As may be appreciated, the operators within a voice-driven system must learn how to operate and work with the terminals, take voice or speech directions through the terminals, provide speech input to the terminal as a task is carried out and completed, and ultimately progress through the sequential tasks using speech. For example, filling a product order within a warehouse or other inventory environment might require the terminal operator to be told to go to various different locations within the warehouse (for example, an aisle, a slot within the aisle, a bin within the slot, etc.), and pick a product from that location. This is done sequentially, product by product, until an order is filled. The worker progresses, using speech, through various different locations to complete the order. The central system directs the operator's progress, and in fact, simultaneously directs the progress of multiple operators, and receives data through speech. The terminal, using speech recognition, converts the operator's inputs to a usable data form for the central system.

In order to become familiar with working in such a voice-driven environment, usually an operator must be trained in how to use the system, and how to interface with the mobile terminal that the operator wears, or carries around, with them through the day. Such training often requires the operator to progress through a sample task, under the supervision of a supervisor. The supervisor listens in on the operator's terminal, as the operator progresses through a task. For example, referring to FIG. 1, a typical system 10 for training might involve an operator with an operator terminal 12 and a headset 14. The operator terminal 12 is used to give speech instructions to the operator, who then answers back with speech to the terminal, and ultimately, to the central system, as the task progresses. The operator terminal 12 incorporates a radio link, or other wireless link to report to a supervisor through a supervisor terminal 16. The supervisor terminal also incorporates a headset 18, so that the supervisor may listen in on the progress of the various tasks handled by the operator. To that end, the operator terminal might incorporate a radio link, such as an FM transmitter 20, while the supervisor terminal 16 incorporates an FM receiver 22. With the supervisor listening in on the operator's terminal and the progression of the spoken tasks, the supervisor can then determine if the operator is utilizing the terminal properly, and can determine where, in the task progress, the operator makes a mistake or becomes confused. In that way, the supervisor may then intervene, and correct the operator, or otherwise help them along in the proper execution of the task.

While such a system, as shown in FIG. 1, provides one means of adequately overseeing a worker or operator in a voice-driven system, it suffers from some significant drawbacks. Particularly, because the supervisor is listening directly to the real-time bi-directional voice dialogue of the operator, the supervisor must understand the operator's language. The speech recognition and text-to-speech capabilities of an operator's terminal are geared to the native language of the operator. In various voice-directed systems, such as large warehousing and inventory facilities, the situation often arises wherein the supervisor is overseeing one or more workers, who speak a different primary or native language from the supervisor. For example, in a European application, a facility that has predominantly Czech operators might be overseen or supervised by a German-speaking supervisor. As such, the supervisor must listen to the operator terminals in a language that is different from the supervisor's native tongue. In North American applications, an English-speaking supervisor might be overseeing a facility that employs a large number of Spanish-speaking workers. As such, the supervisors, or trainers, are often struggling with listening in to the operator's progress in a language that the supervisor is not fluent in.

To address such a drawback, it may be desirable to provide a translation of the bi-directional voice dialogue on the operator's terminal. However, such translation not only slows down the progress of the training, but also increases the cost and complexity of the supervisor's and operator's terminals. Accordingly, a need still exists in the art today to address training within a voice-driven system, wherein a supervisor oversees the task progress of one or more operators. There is particularly a need for use in a voice-driven system, where the supervisor and operators may speak different native languages. Accordingly, the present invention addresses the needs in the art, and provides various benefits over the prior art, as discussed further herein below.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE EMBODIMENTS

The present invention provides a system for supervising an operator or other trainee in a speech-driven environment in an efficient and cost-effective manner. The present invention is particularly useful for situations, wherein the supervisor and the operator speak different native languages. Specifically, an operator terminal might be configured for running a bi-directional speech task, with an operator in a first spoken language. The speech task includes a plurality of successive nodes, or steps, that are encountered by the operator. The successive nodes indicate progress through the bi-directional speech task. A supervisor terminal is configured for running a bi-directional speech task with a supervisor in a second spoken language that is different from the first spoken language. In one embodiment of the invention, the operator terminal and supervisor terminal essentially run the same bi-directional speech task. A communication link, such as a WiFi link, exists between the operator terminal and supervisor terminal for communicating information therebetween. The supervisor terminal then synchronizes its progress through the supervisor speech task, based upon the progress of the operator in the task of the operator terminal. Because the progress of the speech task on the supervisor terminal proceeds in a different spoken language from the task on the operator terminal, it can be configured to operate in the supervisor's native tongue, while the operator terminal operates in the operator's native tongue. The supervisor does not have to understand the operator's language. Rather, the supervisor follows the progress of the operator task, node-by-node or step-by-step, without having to translate or understand the operator's native language. In that way, the supervisor knows what part of the task is a problem. The progress through the various nodes/steps of the task are monitored by the supervisor in the supervisor terminal, and the supervisor can then correct the operator, make suggestions, and otherwise train the operator to progress through the task properly.

Figure 1:
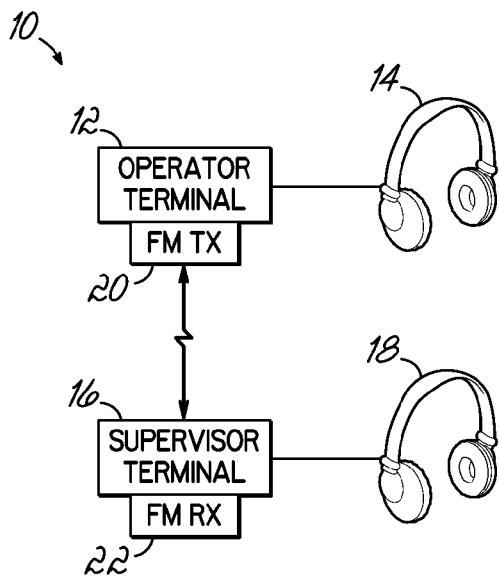
FIG. 1 is a block diagram view of a prior art training system for a voice-driven system.
Figure 2:
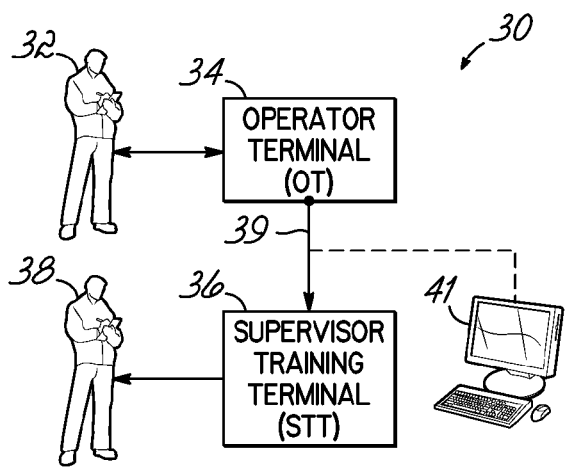
FIG. 2 is a schematic diagram of one embodiment of the present invention.

Turning to FIG. 2, one embodiment is a system 30 incorporating the invention as shown. An operator 32 operates utilizing an operator terminal (OT) 34. As noted above, with respect to FIG. 1, the operator terminal will incorporate a headset 14 with a speaker or microphone, and other suitable components for facilitating a bi-directional speech or voice communication between the operator and the operator terminal. Furthermore, the operator terminal 34 includes the necessary components for communicating with the central computer system, or central system 40 (See FIG. 3), which controls the speech-driven environment by giving orders to the operators through voice, receiving the spoken responses and feedback from the operators, collecting all the gathered data, and generally facilitating the various tasks being performed by all the various operators and supervisors in such a system.

In accordance with one aspect of the invention, the operator terminal 34 communicates with a supervisor training terminal (STT) 36, which is worn or carried by a supervisor 38. A suitable wireless link, such as a wireless Ethernet, or WiFi link 39 may be utilized so that the operator terminal 34 can communicate, to the supervisor terminal 36, certain information regarding the progress of a speech task in the operator terminal 34. For the purposes of understanding the invention, it is helpful to discuss the background in which the various operator terminals 34 might be utilized in an overall voice-driven system.

Figure 3:
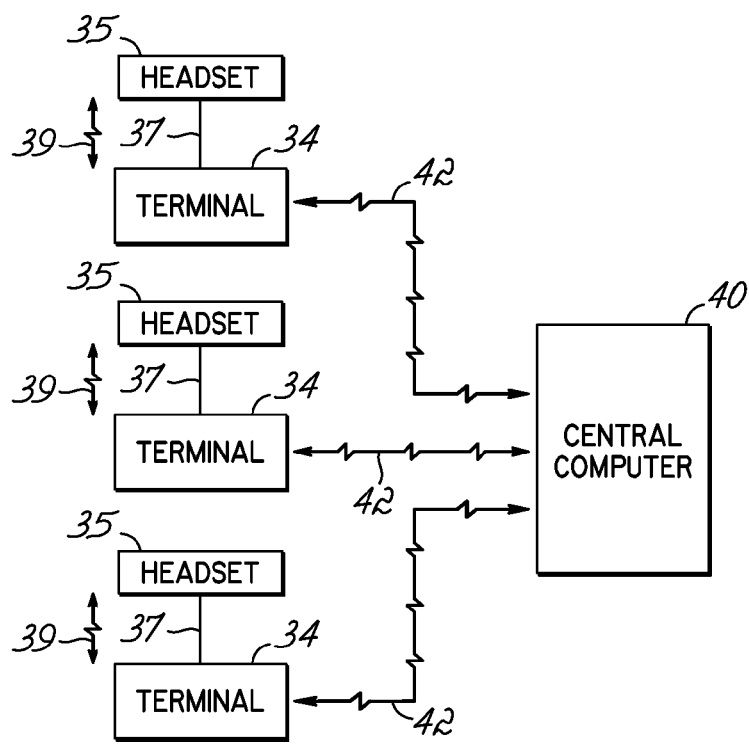
FIG. 3 is a schematic diagram of a voice-driven system for implementing the invention.

Referring to FIG. 3, the mobile operator terminals 34 operate in a voice-driven system and permit a variety of operators 32 to communicate with one or more central system computers 40, which are part of a larger system for sending and receiving information regarding the activities and tasks to be performed by the operator. The central computer 40 (which may be multiple computers) may run one or more system software packages for handling a particular voice or speech task, such as speech-driven inventory and warehouse management.

Terminal 34 communicates with central computer 40, with a wireless link 42, as is known in the art. Headsets 35 are coupled to the terminals 34. Headsets 35 may be coupled to the terminal by respective cords 37, or by a wireless link 39.

Figure 4:
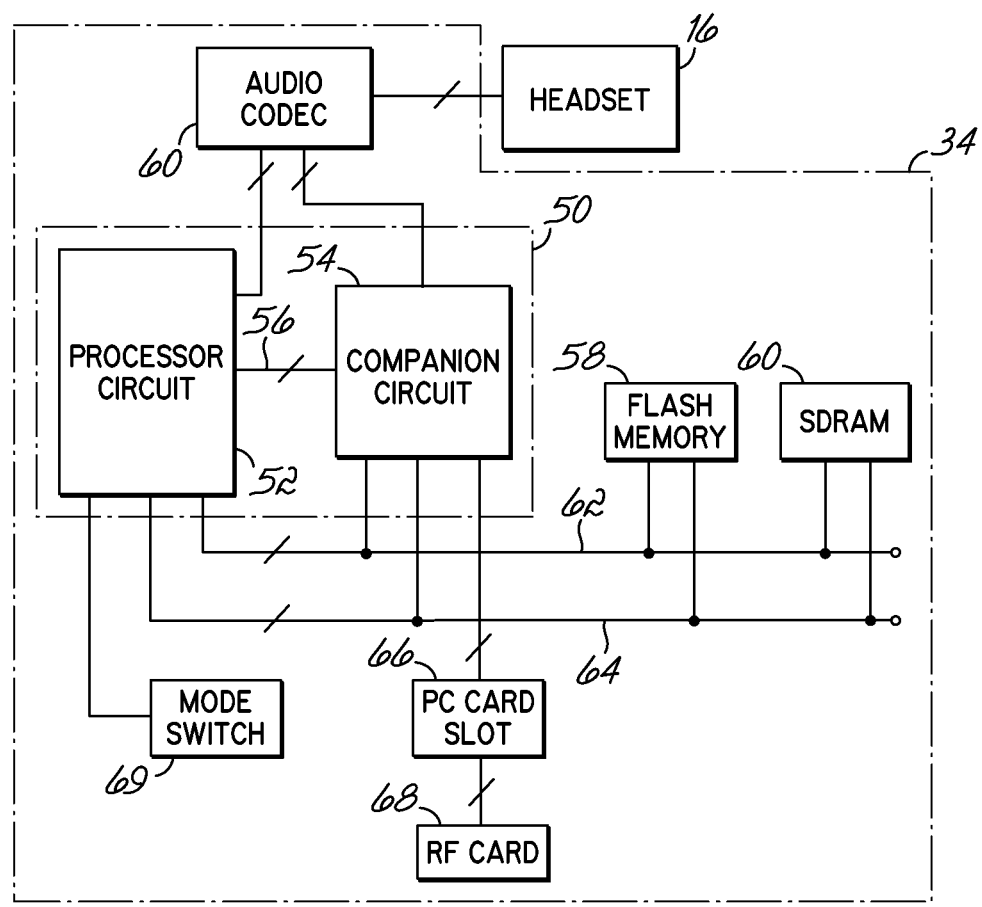
FIG. 4 is a schematic diagram of a terminal embodiment for implementing the invention.

FIG. 4 is a block diagram of one exemplary embodiment of a terminal and headset for implementing the invention. A brief explanation of the interaction of the headset and terminal is helpful in understanding the voice-driven environment of the invention. Specifically, the terminal 34 for communicating with a central computer may comprise processing circuitry 50, which may include a processor 52 for controlling the operation of the terminal and other associate processing circuitry. As may be appreciated by a person of ordinary skill in the art, such processors generally operate according to an operating system, which is a software-implemented series of instructions. The processing circuitry 50 may also implement one or more application programs in accordance with the invention. In one embodiment of the invention, a processor, such as an Intel SA-1110, might be utilized as the main processor and coupled to a suitable companion circuit or companion chip 52 by appropriate lines 56. One suitable companion circuit might be an SA-1111, also available from Intel. The processing circuitry 50 is coupled to appropriate memory, such as flash memory 58 and random access memory (SDRAM) 60. The processor and companion chip 52, 54, may be coupled to the memory 58, 60 through appropriate busses, such as 32 bit parallel address bus 62 and data bus 64. The processing circuitry 50 may also incorporate audio processing circuits such as audio filters and correlation circuitry associated with speech recognition. One suitable terminal for implementing the present invention is the Talkman® line of products available from Vocollect of Pittsburgh, Pa.

To provide wireless communications between the portable terminal 34 and central computer 40, the terminal 34 may also utilize a PC card slot 66, so as to provide a wireless Ethernet connection, such as an IEEE 802.11 wireless standard. RF communication cards 68 from various vendors might be coupled with the PCMCIA slot 66 to provide communication between terminal 34 and the central computer 40, depending on the hardware required for the wireless RF connection. The RF card allows the terminal to transmit (TX) and receive (RX) communications. Other wireless links 42 might also be used and the invention is not limited to a wireless standard.

In accordance with one aspect of the present invention, the terminal is used in a voice-driven system, which uses speech recognition technology and text-to-speech (TTS) technology for communication. The headset provides hands-free voice communication between the operator and the central computer, such as in a warehouse management system. To that end, digital information is converted to an audio format, and vice versa, to provide the bi-directional speech communication between the system and an operator. For example, in a typical system, the terminal receives digital instructions from the central computer and converts those instructions to audio speech to be heard by an operator. The operator then replies, in a spoken language, and the audio reply is recognized using speech recognition, and is converted to a useable digital format to be transferred back to the central computer of the system.

Figure 5:
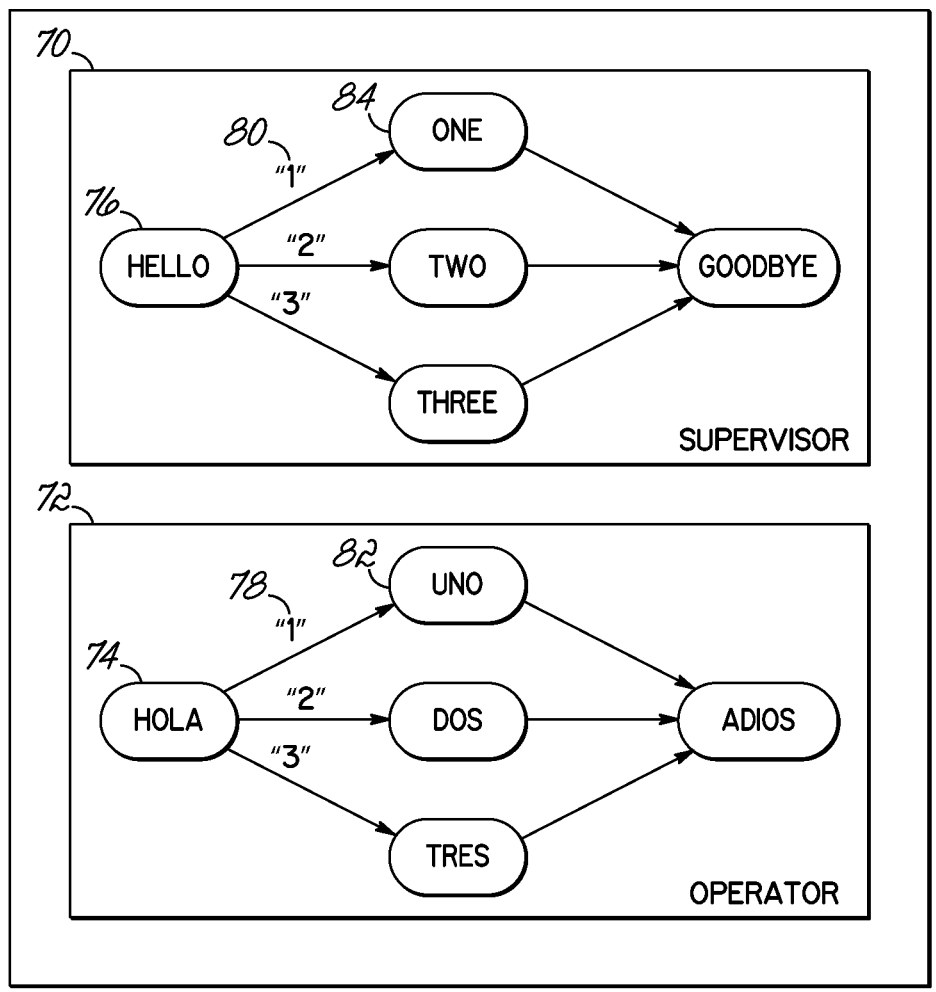
FIG. 5 is a flow diagram of the operation of one embodiment of the present invention through a voice-driven application.
Figure 6:
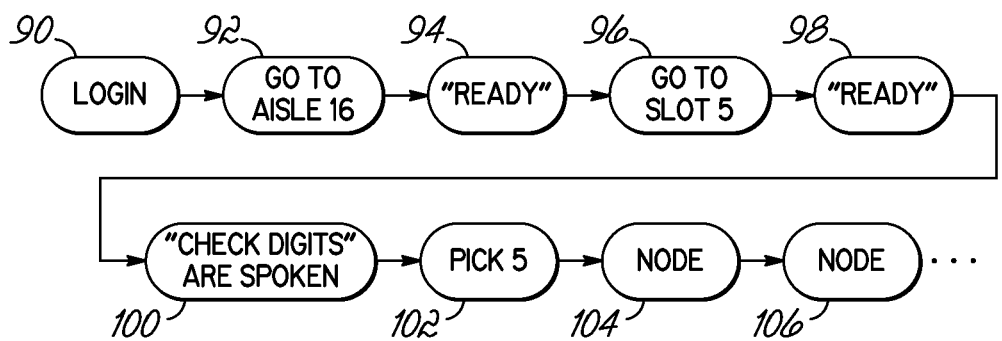
FIG. 6 is a flow diagram of one exemplary voice-driven task, and its progression.

FIGS. 5 and 6 illustrate examples of the present invention, wherein an operator terminal and a supervisor terminal progress through a task, such as a bi-directional speech task, in synchronized fashion, according to one aspect of the present invention. For example, referring to FIG. 5, reference numeral 70 illustrates the task progress for a supervisor terminal, whereas reference numeral 72 indicates a similar task progress for an operator terminal. The task 70 and 72, in the form of a speech task, are performed in different languages. For example, the operator task 72 progresses in Spanish, while the supervisor task progresses in English. It should be understood that the task illustrated in FIG. 5 is very simplistic for the purposes of illustration. The task might include any number of different steps and nodes, such as the task as illustrated in FIG. 6.

In the operator task, a greeting might be made to tell the system that the operator, or worker, is ready to begin the task. As such, an operator utilizing Spanish would speak, "Hola". The operator terminal 34 would then communicate to the supervisor terminal 36 through the communication link 39 the progress of that greeting 74. The supervisor terminal then indicates to the supervisor that the task has started. However, such indication may be in English, and the word, "Hello" might be heard by the supervisor 38, pursuant to task 70 (See block 76). Alternatively, the supervisor task might simply indicate that the operator has progressed past the greeting node 74.

Often times, in a speech-driven environment, the speech recognition engine, or software, must be trained by a particular operator or speaker. In such training, the operator is asked to say a word, and then to repeat that word several times. This occurs for several words in the vocabulary for a particular speech system or speech task, so that the speech engine can train itself on how the particular operator speaks. In that way, the speech engine for an operator's terminal 36 will become educated about the pronunciation and speaking habits of the specific operator 38.

In a speech task, and particularly one directed to inventory and order-filling, numbers are often utilized. Therefore, as part of the training, an operator would be requested to speak each of the numerals 0 through 9. Referring again to FIG. 5, and the operator task 72, the operator would be asked to speak the word indicative of the numeral "1", as shown in step 78. This would also be reflected in task 70, on the supervisor training terminal, as indicated by step 80. The operator would then speak the appropriate word for the numeral "1" in the operator's language. In Spanish, as indicated in task 72 of FIG. 5, the word "Uno" is spoken (step 82). As the operator terminal task 72 progresses to step 82, it communicates that task progress to supervisor training terminal 36, so that the supervisor terminal task 70 also progresses to a similar node 84. However, the progress to that node in the supervisor's native language of English would be the word, "One". Therefore, the supervisor will understand that the operator, during their training, will be speaking the word for the numeral "1", whatever that word may be. The supervisor does not have to translate the actual word spoken by the operator, nor do either the operator or supervisor terminals have to utilize a translation step, or otherwise perform signal processing for signals passed between the operator terminal 34 and supervisor training terminal 36. Rather, the progression of tasks 70 and 72 are synchronized. Similarly, as illustrated in FIG. 5, the operator will proceed through the other nodes of the task, such as speaking training words for the numerals, "2" and "3". Although only a couple of training examples are shown in the nodes for the tasks illustrated in FIG. 5, it will be readily understood that the tasks could comprise any number of different words, nodes, and path progressions for the speech training. Each time, as the operator progresses to the next node, the operator terminal 34 communicates to the supervisor training terminal 36 the information regarding the progress through the operator task 72. The supervisor training terminal then progresses through the supervisor task 70, synchronized with the progress of the operator task 72, as communicated by the operator terminal. In that way, the supervisor 38 is able to see the training progress of a particular operator.

Both the operator and supervisor progress through the tasks in their own native language, and are thus, comfortable during the training process. If the operator struggles at a particular step or node in the task, the supervisor is able to know where the operator is struggling, and will be able to help them progress through the task or make any other corrections as necessary. One particular advantage of the invention is that training time is reduced in a multi-lingual worksite because the supervisor is working in his native language. Therefore, when the supervisor or other training staff is not fluent in the operator's language, the present invention facilitates more efficient training.

In another aspect of the present invention, each of the terminals within a system may be selectively configured for operating either as an operator terminal or a supervisor terminal. As noted above, one suitable device and system for implementing the present invention is the Talkman® terminal available from Vocollect. Such a Talkman® terminal is able to run various software programs to implement speech-driven tasks. In accordance with one aspect of the present invention, the terminal might operate in one of at least two different modes that could be selected by a suitable mode switch 69, as illustrated in FIG. 4. The mode switch 69 might be implemented in hardware or software on a suitable terminal 34. The terminal may then be selectively configured to run in operator mode or in supervisor mode. In operator mode, the software of the terminal operates to communicate information to a terminal in supervisor mode. For example, a software flag might be set in a terminal running in operating mode to transmit the task progress to a terminal that is set to work in the supervisor mode. Then, the terminal in supervisor mode is set to run a particular task in parallel, or synchronized, to the operator terminal. The supervisor training terminal in supervisor mode would then receive or "hear" the node-by-node task progression in the supervisor's chosen language, as noted above. In that way, the supervisor training terminal performs real-time task translation so the supervisor can then progress through the dialogue in their native language, while an operator trains in the operator's native language.

In communicating task progression to the supervisor training terminal 36, the operator terminal 34 would target the IP address of the supervisor training terminal receiver circuitry, in the example of utilizing a WiFi communication link 39 between the OT and the STT. As the task is being run on the operator terminal, it will communicate to the supervisor training terminal in a peer-to-peer system. Such communication can be implemented in a number of different ways, and the present invention is not limited to the type of communication link 39, which might be utilized between an operator terminal and a supervisor training terminal.

For example, Vocollect, who offers the Talkman® terminal, also offers a software product called Task Master. The Task Master functionality might be utilized to communicate the task progress on the operator terminal to the supervisor training terminal. In one embodiment, the supervisor training terminal, operating in supervisor mode, only needs to listen to the operator terminal; the communication is one way. In alternative embodiments of the invention, the communication link between the supervisor training terminal and the operator terminal might be a two-way communication link, thus allowing the supervisor to speak directly to an operator, as the need arises.

In accordance with another feature of the present invention, a monitor, such as a computer monitor, or other graphical display device might be utilized to graphically display the progress as communicated on communication link 39. That is, the operator terminal 34 communicates, to the monitor 41, the information regarding progress through the operator terminal speech task. In that way, the operator's progress might be further monitored and tracked. However, there are distinct training advantages in having the supervisor training terminal, in real time, progress in parallel through the nodes of the task, as the operator progresses, so that the supervisor can engage the operator in the training process in real time. Therefore, the "end point" for the communication provided by link 39 from the operator terminal 34 might be another terminal, such as supervisor training terminal 36, or a graphical monitor 41.

FIG. 6 illustrates one possible task, and its various nodes that an operator might utilize in a training scenario, or in an actual work task within a speech-driven environment. FIG. 6 is merely exemplary, and it will be appreciated that the task can be configured in any appropriate way, depending upon the job to be done. Referring to FIG. 6, the operator might go through a login procedure (step or node 90), wherein the operator enters their name, password, and any other suitable information to start the task. At such a login stage, for example, one or more voice templates, as earlier trained through the voice of the operator (See FIG. 5), might be loaded on the terminal so that the terminal is configured for that specific operator or speaker. Once the login process is completed, the task may direct the operator to take a particular action (node 92). For example, in an inventory/order-filling scenario, the operator might be directed to go to a specific aisle in a warehouse (Go To Aisle 16). Once the operator reaches that aisle, they may speak the necessary word or words to indicate to the central computer system that they are ready to continue. For example, as shown in FIG. 6, the operator might speak, "ready" (node 94), or another suitable word in their native language to indicate their readiness to proceed. As noted above, an operator terminal would transmit information regarding task progression to a supervisor training terminal, where the supervisor will know that the operator has progressed through the login (node 90), and received some instruction (node 92), and is now available to proceed. The supervisor training terminal might also speak the word, "ready" to the supervisor in the task progression (if the supervisor speaks English). However, the supervisor will know that the operator has indicated such readiness when the supervisor sees that the task progresses to the next instruction (node 96). At step 96, the operator might be directed to go to a specific slot in an aisle, such as slot 5 (Go To Slot 5). Again, the operator would indicate that they are ready (node 98), when they have reached that location. To verify that the operator is at the proper location, the operator might speak one or more check digits (node 100), which will allow the central computer system to verify that they are at aisle 16, and slot 5. If so, the system might direct the operator to pick a number of items (Pick 5) (node 102). As the task progresses, the progression is transmitted to a supervisor training terminal, which follows along in a synchronized, or parallel fashion, through each of the successive nodes 104, 106, etc. to the end of the task. At each node, or each stage of the task progression, the supervisor training terminal knows where the operator is, and can intervene as necessary during training to assist the operator, correct any errors, or otherwise facilitate the training.

In one embodiment, both the operator terminal and the supervisor training terminal would run the same tasks. In that way, in node-by-node progression, the supervisor training terminal would be able to track, in synchronized fashion, the exact progress of the operator. In another embodiment of the invention, the supervisor training terminal might run a slightly different task, although similar to the task run by the operator terminal so that oversight and training may be facilitated. However, it is not a requirement that both of the tasks be identical, only that the operator terminal communicate its task progression to the supervisor training terminal so that the supervisor may progress through its specific task synchronized to the operator terminal.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A system for supervising an operator in a speech-driven environment comprising:

an operator terminal configured for running a bi-directional speech task with an operator using text-to-speech that operates in a first spoken language, the speech task including a plurality of predefined and successive nodes that are encountered by the operator in a node-by-node progression, indicating stages of progress through the speech task;

a supervisor terminal configured for running a bi-directional speech task with a supervisor in parallel with the operator terminal speech task and using text-to-speech that operates in a second spoken language that is different from the first spoken language;

a communication link between the operator terminal and supervisor terminal for communicating information there between;

the operator terminal operable to communicate, to the supervisor terminal, speech and feedback information that points to a specific stage of progress of the operator in the node-by-node progression through the operator terminal speech task;

the supervisor terminal operable for progressing through the supervisor terminal speech task in a parallel nodeby-node progression that is synchronized with the progress of the operator terminal speech task based on the speech and feedback information regarding the specific stage of progress that is communicated by the operator terminal, the parallel node-by-node progression communicated to the supervisor using text-to-speech in the second spoken language; and a monitor configured for displaying the operator's node-by-node progression, wherein the node-by-node progression is graphically displayed on the monitor upon receipt of speech data from said operator terminal.

2. The system of claim 1 wherein at least one of the operator terminal and the supervisor terminal are configured for selectively operating as either an operator terminal or a supervisor terminal.

3. The system of claim 1 wherein the at least one operator terminal or supervisor terminal includes a switch for selectively switching the terminal to operate as either an operator terminal or supervisor terminal.

4. The system of claim 1 further comprising a monitor for graphically displaying progress through a speech task, the operator terminal operable to communicate, to the monitor, speech and feedback information regarding progress through the operator terminal speech task.

5. The system of claim 1 wherein the communication link is a wireless link.

6. The system of claim 1 wherein the operator terminal and supervisor terminal run the same speech task.

7. A system for supervising an operator in a work environment comprising:

an operator terminal configured for running a speech task program with an operator using text-to-speech in a first spoken language, the speech task program including a plurality of predefined and successive nodes that are encountered by the operator in a node-by-node progression, indicating stages of progress through the speech task program;

a supervisor terminal configured for running a speech task program with a supervisor in parallel with the operator terminal speech task program using text-to-speech in a second spoken language different from the first spoken language;

a communication link between the operator terminal and supervisor terminal for communicating information there between;

the operator terminal operable to communicate, to the supervisor terminal, mode, speech and feedback information that points to specific stage of progress of the operator in the node-by-node progression through the operator terminal task program;

the supervisor terminal operable for progressing through the supervisor terminal task program in a parallel node-by-node progression that is synchronized with the progress of the operator terminal task program based on the speech and feedback information regarding the specific stage of progress that is communicated by the operator terminal, the node-by-node progression communicated to the supervisor using text-to-speech in the second spoken language; and a monitor configured for displaying the operator's node-by-node progression, wherein the node-by-node progression is graphically displayed on the monitor upon receipt of speech data from said operator terminal.

8. The system of claim 7 wherein at least one of the operator terminal and the supervisor terminal is configured for selectively operating as either an operator terminal or a supervisor terminal.

9. The system of claim 7 further comprising a monitor for graphically displaying progress through a speech task, the operator terminal operable to communicate, to the monitor, the speech and feedback information regarding progress through the operator terminal speech task.

10. The system of claim 7 wherein the communication link is a wireless link.

11. The system of claim 7 wherein the operator terminal and supervisor terminal run the same task program.

12. A method for supervising an operator in a speech-driven environment comprising:

on an operator terminal, running a bi-directional speech task with an operator using text-to-speech that operates in a first spoken language, the speech task including a plurality of predetermined and successive nodes that are encountered by the operator in a node-by-node progression, indicating stages of progress through the speech task;

on a supervisor terminal, running a bi-directional speech task with a supervisor in parallel with the operator terminal speech task and using text-to-speech that operates in a second spoken language that is different from the first spoken language;

monitoring, with the supervisor terminal, progress of the operator in the node-by-node progression through the operator terminal speech task using mode, speech and feedback information from the operator terminal that points to a stage of progress through the operator terminal speech task;

controlling the progress through the supervisor terminal speech task in a parallel node-by-node progression so that it is synchronized with the progress through the operator terminal speech task based on the speech and feedback information from the operator terminal;

communicating the node-by-node progression to the supervisor using text-to-speech in the second spoken language; and displaying on a monitor the operator's node-by-node progression, wherein the node-by-node progression is graphically displayed on the monitor upon receipt of speech data from said operator terminal.

13. The method of claim 12 further comprising communicating, from the operator terminal to the supervisor terminal, the speech and feedback information regarding progress of the operator terminal speech task.

14. The method of claim 12 further comprising communicating between the operator and supervisor terminals with a wireless link.

15. The method of claim 12 further comprising graphically displaying the progression through the operator terminal speech task.

16. The method of claim 12 further comprising running the same speech task on the operator terminal and supervisor terminal.

17. A method for supervising an operator in a work environment comprising:

on an operator terminal, running a speech task program with an operator using text-to-speech in a first spoken language, the speech task program including a plurality of predetermined and successive nodes that are encountered by the operator in a node-by-node progression, indicating stages of progress through the speech task program;

on a supervisor terminal, running a speech task program with a supervisor in parallel with the operator terminal speech task program using text-to-speech in a second spoken language different from the first spoken language;

monitoring, with the supervisor terminal, progress of the operator in the node-by-node progression through the operator terminal speech task program using mode speech and feedback information from the operator terminal that points to a stage of progress through the operator terminal speech task program;

controlling the progress through the supervisor terminal speech task program in a parallel node-by-node progression so that it is synchronized with the progress through the operator terminal speech task program based on the speech and feedback reformation from the operator terminal;

communicating the node-by-node progression to the supervisor using text-to-speech in the second spoken language; and displaying on a monitor the operator's node-by-node progression, wherein the node-by-node progression is graphically displayed on the monitor upon receipt of speech data from said operator terminal.

18. The method of claim 17 further comprising communicating, from the operator terminal to the supervisor terminal, the speech and feedback information regarding progress of the operator terminal task program.

19. The method of claim 17 further comprising communicating between the operator and supervisor terminals with a wireless link.

20. The method of claim 17 further comprising graphically displaying the progress through the operator terminal task program.

21. The method of claim 17 further comprising running the same task program on the operator terminal and supervisor terminal.

22. A system, for supervising an operator comprising:

an operator terminal configured for running a speech task in an operator's native language by utilizing text-to-speech functions stored on the operator terminal, the speech task including a plurality of predefined and successive nodes that are encountered by the operator in a node-by-node progression, indicating the stages of progress through the speech task;

a supervisor terminal configured for running a bi-directional speech task with a supervisor in parallel with the operator terminal speech task and using text-to-speech that operates in a second spoken language that is different from the first spoken language;

a communication link between the operator terminal and supervisor terminal for communicating information there between;

the operator terminal operable to communicate, to the supervisor terminal, speech and feedback information that points to a specific stage of progress of the operator in the node-by-node progression through the operator terminal speech task;

the supervisor terminal operable for progressing through the supervisor terminal speech task in a parallel node-by-node progression that is synchronized with progress of the operator terminal speech task based on the speech and feedback information regarding a specific stage of progress that is communicated by the operator terminal, the parallel node-by-node progression communicated to the supervisor using text-to-speech in the second spoken language; and a monitor configured for displaying the operator's node-by-node progression, wherein the node-by-node progression is graphically displayed on the monitor upon receipt of speech data from said operator terminal.

* * * * *